United States Patent [19]

Sakai et al.

[11] Patent Number: 5,362,467
[45] Date of Patent: Nov. 8, 1994

[54] PROCESS FOR PRODUCING CARBON DIOXIDE CLATHRATE

[75] Inventors: Matsushige Sakai; Akira Saji; Hidetomo Noda, all of Nagoya; Takeo Hondoh, Sapporo; Tadaaki Tanii, Takasago; Masaru Ishibashi, Takasago; Masaaki Negoro, Takasago; Yutaka Kawata, Takasago; Takefumi Murakami, Takasago; Hikaru Kitamura; Toshihiro Kamata, both of Kobe, all of Japan

[73] Assignees: Chubu Electric Power Company, Incorporated, Aichi; Mitsubishi Jukogyo Kabushiki Kaisha, Tokyo, both of Japan

[21] Appl. No.: 981,328

[22] Filed: Nov. 24, 1992

[30] Foreign Application Priority Data

Dec. 2, 1991 [JP] Japan ................. 3-317735

[51] Int. Cl.$^5$ ............................. C01B 31/22
[52] U.S. Cl. .................. 423/437 R; 423/220; 423/415.1; 23/295 R; 588/261; 62/532; 62/73
[58] Field of Search .......... 23/295 R; 423/220, 415 R, 423/437 R, 415.2, 415.1; 55/82; 62/71, 73, 352, 532; 588/261; 95/290; 422/245

[56] References Cited

U.S. PATENT DOCUMENTS 4,324,109 4/1982 Garland .................. 62/353
4,505,121 3/1985 Gram ...................... 62/60

FOREIGN PATENT DOCUMENTS

0429154A1 5/1991 European Pat. Off. .
594562 3/1934 Germany .
2-29575 1/1990 Japan ..................... 62/73
2169980 6/1990 Japan ..................... 62/73

OTHER PUBLICATIONS

European Search Report Date of Completion of Search: 12 Mar. 1993.

Primary Examiner—Gary P. Straub
Assistant Examiner—Timothy C. Vanoy
Attorney, Agent, or Firm—Nixon & Vanderhye

[57] ABSTRACT

A carbon dioxide clathrate having a lump diameter enough to precipitate on a desired abyssal position of the sea without being drifted by a seawater flow of the abyss can be produced by bringing an aqueous solution into contact with carbon dioxide with the interposition of an interface in a reactor and retaining this contact; adjusting the pressure in the reactor to 13 atm or more, the temperature of the aqueous solution to a level of more than 5° C. to 10° C., the temperature of the interface to a level of more than 10° C. to 15° C. and the temperature of a lug inserted into the aqueous solution to a level of more than 0° C. to 5° C.; producing/growing the carbon dioxide clathrate on the lug; and then heating the lug to a temperature of more than 10° C. to 30° C. to separate/drop the carbon dioxide clathrate therefrom.

6 Claims, 5 Drawing Sheets

F I G. 3
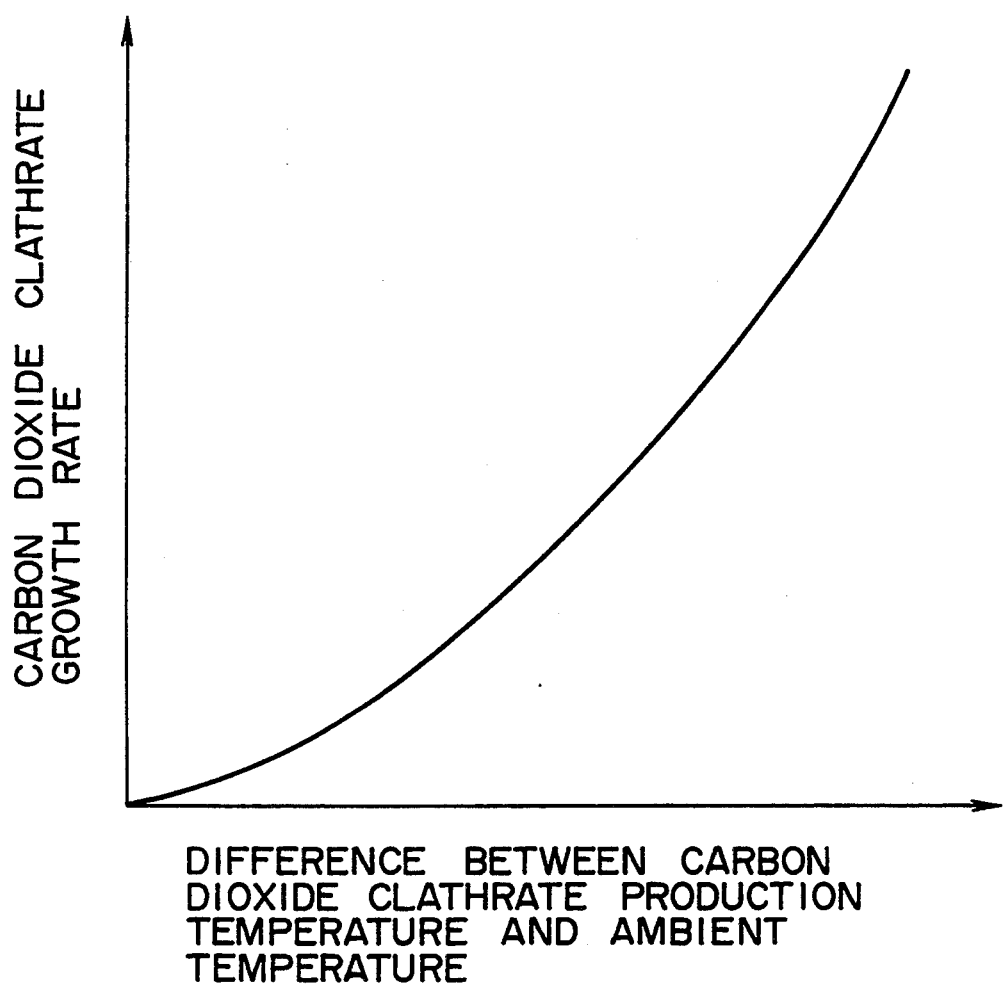

PROCESS FOR PRODUCING CARBON DIOXIDE CLATHRATE

FIELD OF THE INVENTION AND RELATED ART STATEMENT

The present invention relates to a process for producing a carbon dioxide clathrate from carbon dioxide and water or seawater.

In a combustion exhaust gas of a fossil fuel discharged into the atmosphere, the concentration of a carbon dioxide gas tends to increase year by year, and the carbon dioxide gas is remarked as the main cause of a warming phenomenon or a hothouse effect of the earth. This problem is taken up as an international theme on a global scale.

Decreasing the amount of the carbon dioxide gas in the atmosphere is considered to be extremely difficult in practice, but there have been suggested some methods for treating a gas such as a combustion gas discharged from a certain position. One of the suggested methods comprises separating and collecting all or a part of the combustion exhaust gas of the fossil fuel, forwarding the collected gas to the abyss of the sea, and then precipitating a crystalline compound of seawater and the carbon dioxide gas, i.e., a carbon dioxide clathrate.

The carbon dioxide clathrate is a compound in which carbon dioxide is wrapped in crystallized three-dimensional structure of water, and it is considered that the compound is produced in accordance with a chemical reaction represented by the formula (1)

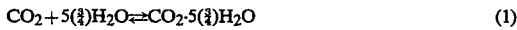

$$CO_2 + 5(\tfrac{3}{4})H_2O \rightleftharpoons CO_2 \cdot 5(\tfrac{3}{4})H_2O \tag{1}$$

This carbon dioxide clathrate is a compound of the carbon dioxide gas, and it is precipitated in the form of a crystalline solid from water.

Heretofore, the carbon dioxide clathrate has been produced at a temperature of more than 0° C. to 10° C. under a pressure of more than 13 atm, but the thus produced carbon dioxide clathrate is in the state of sherbet and fine crystals, and it is not easy to separate it from water. Therefore, when thrown to the abyss of the sea, this carbon dioxide clathrate diffuses due to the stream of the seawater in the depths of the sea sometimes. Thus, in order to fix the carbon dioxide gas in the form of the carbon dioxide clathrate at a desired position in the abyss of the sea, it is suitable that the carbon dioxide clathrate precipitates into lumps which cannot be drifted by the seawater in the depths of the sea.

OBJECT AND SUMMARY OF THE INVENTION

In view of such situations, an object of the present invention is to provide a process for producing a carbon dioxide clathrate having a lump diameter enough to precipitate in a desired abyssal position of the sea without being drifted by seawater.

A process for producing the carbon dioxide clathrate regarding the present invention by which the above-mentioned object can be achieved comprises the step of disposing an aqueous solution portion retaining an aqueous solution of water or seawater and a carbon dioxide portion retaining carbon dioxide in a reactor so that these portions may come in contact with each other with the interposition of an interface, and positioning, in the aqueous solution portion, a lug, of which the temperature is controllable; the step of adjusting the pressure in the reactor to 13 atm or more and the temperature of the aqueous solution in the aqueous solution portion to a level of more than 5° C. to 10° C., and adjusting an interface temperature between the aqueous solution portion and the carbon dioxide portion to a level of more than 10° C. to 15° C.; the step of maintaining the temperature of the lug at a level of more than 0° C. to 5° C. to form crystallized carbon dioxide clathrates on the lug; and the step of heating the lug to a temperature of more than 10° C. to 30° C. to separate and drop the crystallized carbon dioxide clathrate from the lug.

In this case, the step of forming the clathrate on the lug and the step of separating and dropping the clathrate from the lug can be alternately repeated plural times.

Furthermore, the positioning of the lug in the aqueous solution can be carried out after the adjustment of the pressure in the reactor, the temperature of the aqueous solution in the aqueous solution portion and the interface temperature.

Now, the present invention will be described in detail.

A carbon dioxide clathrate is produced by reacting water with a carbon dioxide gas dissolved in water or seawater, and production/growth driving force of the carbon dioxide clathrate is directly proportional to a difference between an operating pressure P and a carbon dioxide clathrate production equilibrium pressure $P_1$ at an operating temperature $T_1$, or a difference between the operating pressure P and a carbon dioxide clathrate production equilibrium pressure $P_2$ at an operating temperature $T_2$ in FIG. 2. Therefore, in order to rapidly produce and grow the carbon dioxide clathrate, it is necessary to rapidly dissolve the carbon dioxide in an aqueous solution at an interface between the aqueous solution of water or seawater and the carbon dioxide during the production/growth of the carbon dioxide clathrate. For the satisfaction of such a requirement, it is necessary to enlarge the difference between the operating pressure P and the carbon dioxide clathrate production equilibrium pressure $P_1$ or $P_2$ at the operating temperature $T_1$ or $T_2$.

That is, a carbon dioxide clathrate production rate is directly proportional to the difference between the operating pressure and the carbon dioxide clathrate production equilibrium pressure at the operating temperature, and in this case, a proportionality constant depends upon the amount of water or seawater, the structure of an apparatus, the operating temperature and the like.

Furthermore, in order to produce the carbon dioxide clathrate having a sufficient lump diameter in water or seawater, the temperature $T_2$ at a carbon dioxide clathrate production/growth position is dropped to a lower level than the ambient temperature $T_1$ to establish the carbon dioxide clathrate production/growth position where a difference between the operating pressure P at the position shown in FIG. 2 and the carbon dioxide clathrate production equilibrium pressure $P_2$ at the operating temperature $T_2$ is larger than a difference between the operating pressure P in the vicinity of the position and the carbon dioxide clathrate production equilibrium pressure $P_1$ at the operating temperature $T_1$.

FIG. 3 shows a relation of the carbon dioxide clathrate production rate to the difference between the carbon dioxide clathrate production position temperature and the ambient liquid temperature. As shown in the same drawing, the carbon dioxide clathrate production rate is directly proportional to a power of the difference between the carbon dioxide clathrate production position temperature and the ambient liquid temperature, and a proportionality constant depends upon the amount of water or seawater, the structure of an apparatus, the operating pressure and the like.

In the present invention, therefore, in order to produce the carbon dioxide clathrate in water or seawater, the pressure in the reactor is adjusted to 13 atm or more which is one of the carbon dioxide clathrate producing conditions and the temperature of water or seawater is adjusted to a level of more than 5° C. to 10° C. which is the other of the carbon dioxide clathrate producing conditions. Additionally, in order to grow the carbon dioxide clathrate as large as possible in water or seawater, a lug is disposed in water or seawater and the temperature of the lug is adjusted to a level of more than 0° C. to 5° C.

The reason why the pressure in the reactor is adjusted to 13 atm or more is that the carbon dioxide clathrate can be produced under a pressure of 12.4 atm or more, and the reason why an upper limit is not given is that the higher the pressure is, the higher the production rate is.

The reason why the temperature of water or seawater is adjusted to a level of more than 5° C. to 10° C. is that when the temperature is in excess of 10° C., the carbon dioxide clathrate is not produced any more, and that when the temperature is in excess of 5° C., a difference between the temperature of water or seawater and the temperature of the producing portion (the lug portion) is kept as large as possible practically to heighten the production rate and when it is 5° C. or less, the production process is economically disadvantageous.

In the present invention, the lug is provided in water or seawater so as to locally produce/grow the carbon dioxide clathrate in water or seawater, but the cooling of the lug to a temperature of more than 0° C. to 5° C. is carried out to enlarge a difference between the temperature of the lug and the ambient temperature and to thereby grow the carbon dioxide clathrate as large as possible. When the temperature of the lug is 0° C. or less, ice is formed together with the carbon dioxide clathrate, which is economically disadvantageous, and when it is in excess of 5° C., the difference between the temperature of the lug and the ambient operating temperature cannot be enlarged.

In the case that the carbon dioxide clathrate is produced at an interface between water or seawater and the carbon dioxide, the produced carbon dioxide clathrate takes the form of a film, which hinders the carbon dioxide from dissolving in water or seawater. Therefore, in order to grow the carbon dioxide clathrate, it is necessary to prevent the carbon dioxide clathrate from being formed at the interface between water or seawater and the carbon dioxide. Thus, in the present invention, in order to prevent the carbon dioxide clathrate from being formed at the interface between water or seawater and the carbon dioxide, an interface temperature between seawater and the carbon dioxide is to be maintained at a level of more than 10° C. to 15° C.

The reason why the interface temperature is more than 10° C. is that when it is more than 10° C., the carbon dioxide clathrate decomposes, and the reason why the interface temperature is not more than 15° C. is that when it is in excess of 15° C., a difference between the interface temperature and the temperature of water or seawater is large, which is economically disadvantageous.

In the present invention, the carbon dioxide clathrate is produced/grown on the lug in water or seawater, and the carbon dioxide clathrate grown on the lug is successively separated therefrom, as described above. Therefore, for this separation, the lug is heated to a temperature of more than 10° C. which is the decomposing conditions of the carbon dioxide clathrate, to 30° C.

The reason why the lug is heated to a temperature of more than 10° C. to 30° C. is that the carbon dioxide clathrate attached to the lug surface can be decomposed at a temperature of more than 10° C. for the purpose of separating the carbon dioxide clathrate from the lug surface, and the lug at the temperature of more than 30° C. is economically disadvantageous.

As described above, according to the present invention, there can be produced the carbon dioxide clathrate having a lump diameter which permits precipitating it at a desired position on the abyss of the sea without being drifted by an abyssal seawater flow.

BRIEF DESCRIPTION OF THE DRAWINGS

FIG. 3 is a view showing a relation of a carbon dioxide clathrate production rate to a difference between a carbon dioxide clathrate production portion temperature and an ambient liquid temperature regarding one embodiment of the present invention.

DETAILED DESCRIPTION OF PREFERRED EMBODIMENTS

Figure 1:
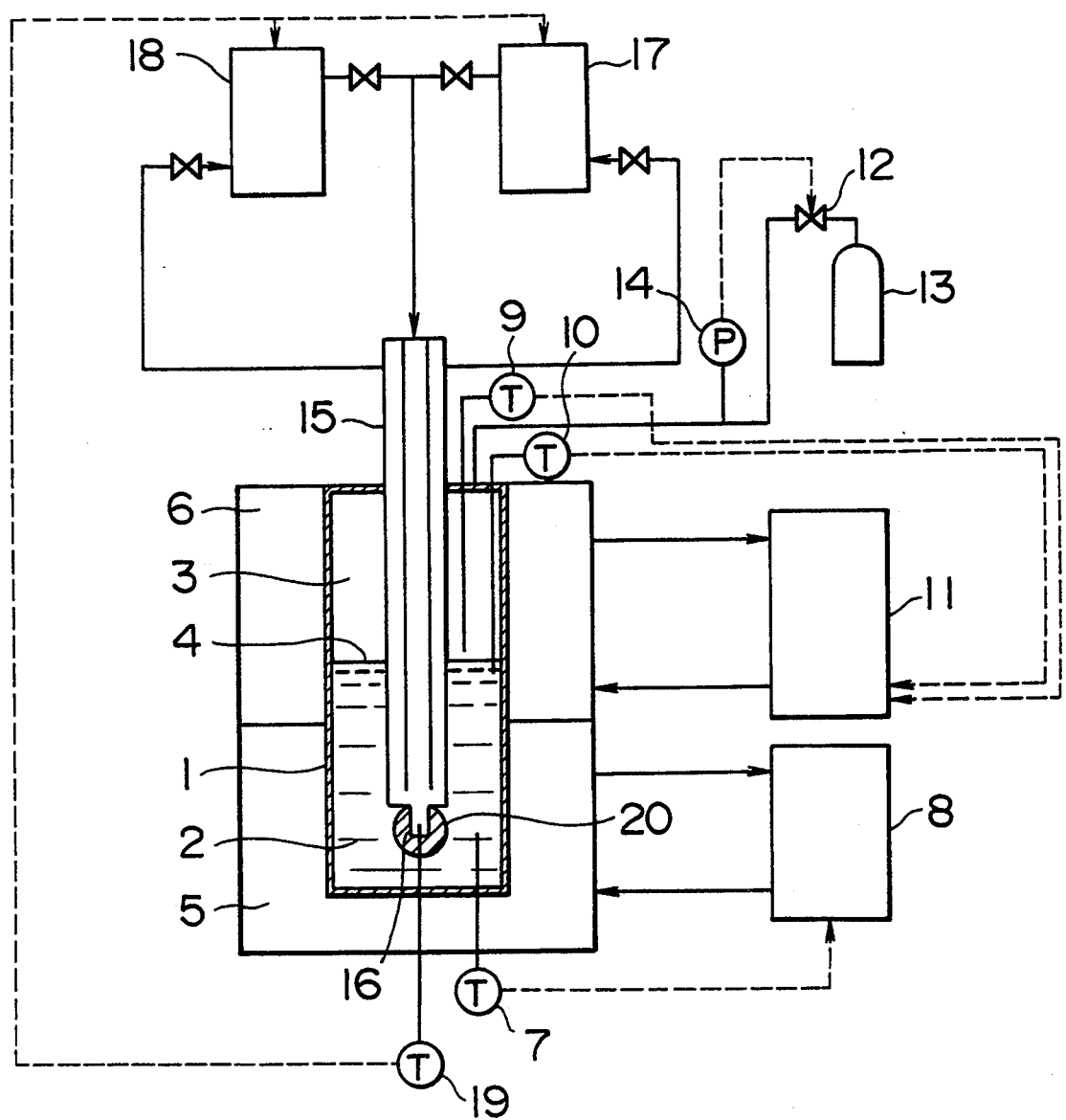
FIG. 1 is a constitutional view of a production apparatus for the practice of a process for producing a carbon dioxide clathrate regarding one embodiment of the present invention.
Figure 2:
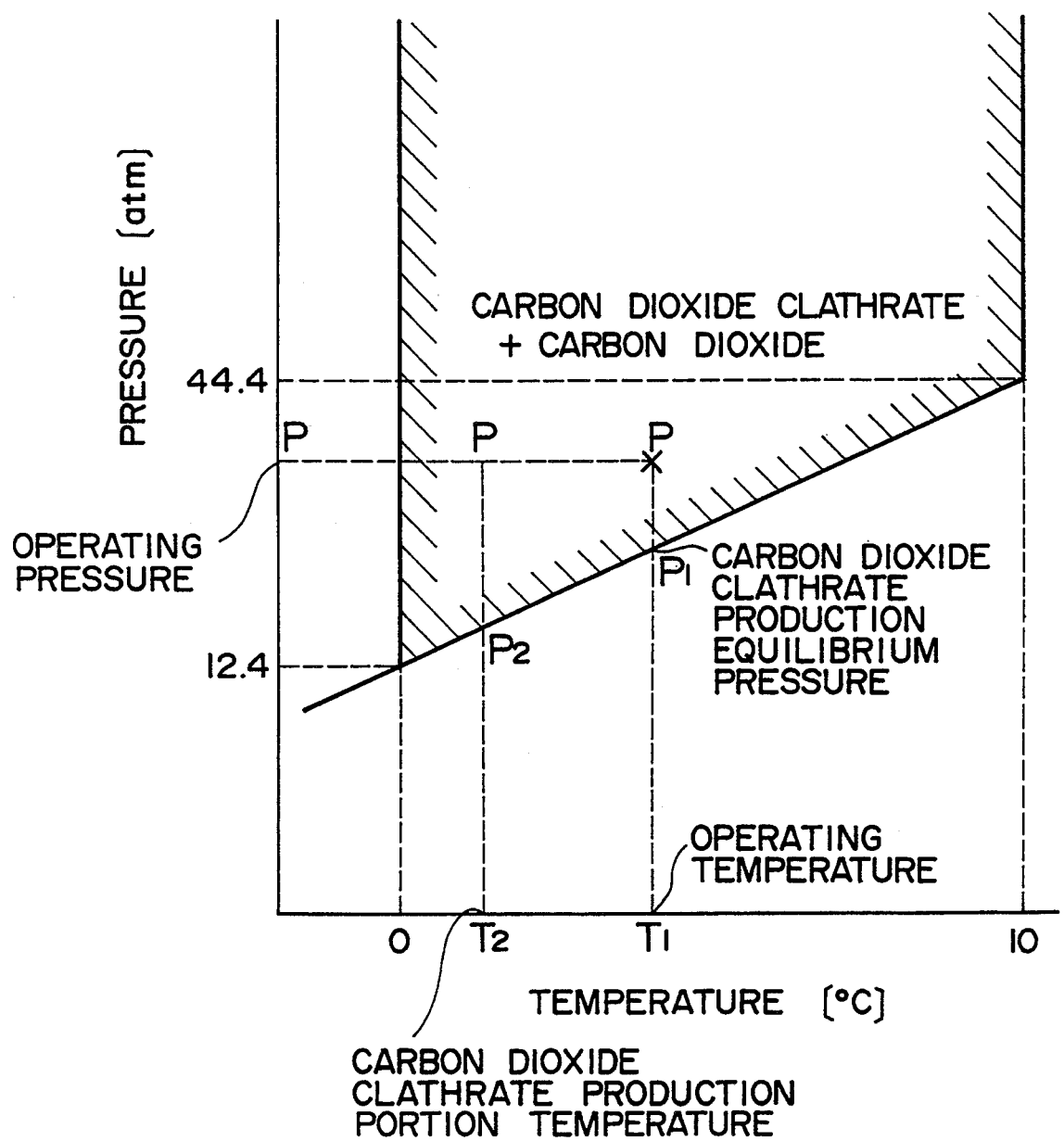
FIG. 2 is a relation view of operating pressure and equilibrium pressure in an equilibrium view of the production of the carbon dioxide clathrate regarding one embodiment of the present invention.

FIG. 1 shows the whole constitution of a production apparatus for the practice of a process for producing a carbon dioxide clathrate regarding one embodiment of the present invention. As shown in this drawing, a reactor 1 is filled with an aqueous solution 2 of water or seawater and a carbon dioxide 3 so that they may come in contact with each other with the interposition of an interface 4. The lower peripheral portion and the upper peripheral portion of the reactor 1 are provided with a jacket 5 for temperature adjustment and a jacket 6 for cooling, respectively, and the interface 4 between the aqueous solution 2 and the carbon dioxide 3 is positioned at a lower portion of the jacket 6 for cooling. Here, the jacket 5 for temperature adjustment is controlled by a water temperature adjusting device 8 connected to a water thermometer 7 for measuring the temperature of the aqueous solution 2. Furthermore, the jacket 6 for cooling is controlled by a carbon dioxide aqueous solution interface temperature adjusting device 11 connected to a carbon dioxide interface thermometer 9 for measuring the temperature of the carbon dioxide 3 in the vicinity of the interface 4 and to an aqueous solution surface thermometer 10 for measuring the temperature of the aqueous solution 2 in the vicinity of the interface 4.

On the other hand, the top side of the reactor 1 is connected to a carbon dioxide bomb 13 via a reactor pressure adjusting valve 12, and this reactor pressure adjusting valve 12 is controlled on the basis of the output of a reactor pressure gauge 14 branched off from between the pressure adjusting valve 12 itself and the reactor 1.

Moreover, a cooling tube 15 for carbon dioxide clathrate production is inserted into the reactor from the top side thereof and disposed therein, and the lower edge of the cooling tube 15 inserted close to the bottom of the aqueous solution 2 is provided with a lug 16. This cooling tube 15 for carbon dioxide clathrate production is connected to a cooler 17 for carbon dioxide clathrate production which forwards a cooling water to control the temperature of the lug 16, and a heating equipment 18 for carbon dioxide clathrate separation which heats the lug 16 at the time of the separation of the carbon dioxide clathrate. The cooler 17 for carbon dioxide clathrate production and the heating equipment 18 for carbon dioxide clathrate separation are constituted so as to be controlled on the basis of the output of a lug thermometer 19.

Reference will be made to one embodiment for producing the carbon dioxide clathrate by the use of an apparatus shown in FIG. 1.

(1) In order to prevent the carbon dioxide clathrate from being produced at the interface 4 which is an aqueous solution surface between the aqueous solution 2 and the carbon dioxide 3, the carbon dioxide aqueous solution interface temperature adjusting device 11 is controlled on the basis of the outputs of the carbon dioxide interface thermometer 9 and the aqueous solution surface thermometer 10 to adjust the amount of the cooling water which is forwarded to the jacket 6 for cooling the reactor, whereby the temperature of the interface 4 between the aqueous solution 2 and the carbon dioxide 3 is adjusted to 10.5° C. in excess of 10° C. which is temperature conditions for preventing the carbon dioxide clathrate from being produced.

(2) In order to produce the carbon dioxide clathrate in the aqueous solution 2, the pressure in the reactor 1 is adjusted to 40 atm with the carbon dioxide from the carbon dioxide bomb 13 by controlling the reactor pressure adjusting valve 12 on the basis of the output of the pressure gauge 14 of the reactor 1 which is the carbon dioxide clathrate production apparatus, and the temperature of the aqueous solution 2 is adjusted to 9.5° C. by controlling the water temperature adjusting device 8 on the basis of the output of the water thermometer 7.

(3) In order to locally produce/grow the carbon dioxide clathrate in the aqueous solution 2, the lug 16 positioned in the aqueous solution 2 is cooled to 1° C. which is a lower temperature than the temperature of the ambient aqueous solution 2, i.e., 9.5° C., by controlling the cooler 17 for carbon dioxide clathrate production on the basis of the output of the lug thermometer 19, thereby forwarding the cooling water through the cooling tube 15 for carbon dioxide clathrate production.

(4) The above-mentioned paragraphs (1) to (3) were met and a carbon dioxide clathrate 20 was allowed to grow on the lug 16 in the aqueous solution 2, and as a result, the carbon dioxide clathrate 20 grew and enlarged with the elapse of time.

(5) Next, in order to separate the carbon dioxide clathrate 20 grown on the lug 16, the heating equipment 18 for carbon dioxide clathrate separation was controlled on the basis of the output of the lug thermometer 19 to heat the lug 16 to 30° C., so that the carbon dioxide clathrate 20 in contact with the surface of the lug 16 was decomposed and then a remained portion of the clathrate was separated from the surface of the lug 16.

Figure 4:
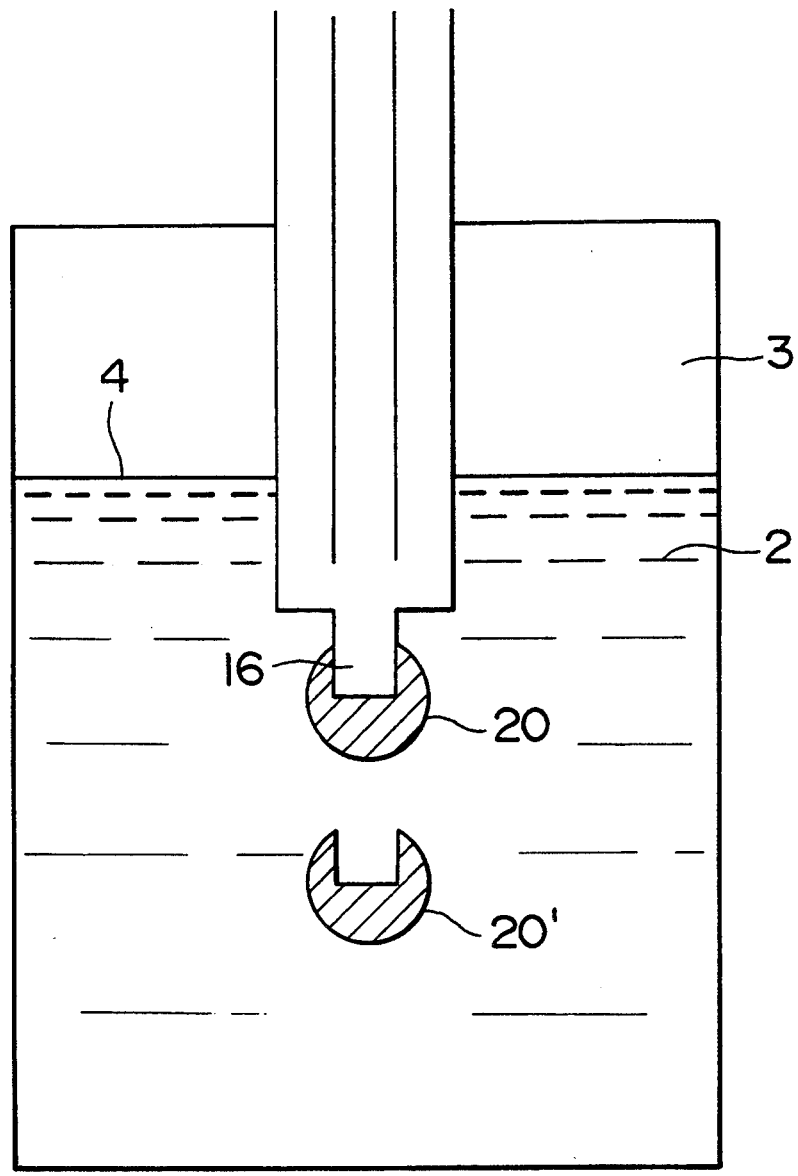
FIG. 4 is an illustrative view showing a situation where the carbon dioxide clathrate is separated from a lug regarding one embodiment of the present invention.

FIG. 4 shows a situation where the carbon dioxide clathrate 20 attached on the surface of the lug 16 is separated therefrom. In the same drawing, 20' denotes the carbon dioxide clathrate which has separated and is being precipitated.

(6) By performing the operations described in the above-mentioned paragraphs (1) to (5), there could be produced the carbon dioxide clathrate having a lump diameter enough to precipitate on a desired abyssal position of the sea without being drifted by a seawater flow of the abyss.

In this connection, when the above-mentioned paragraphs (3) and (5) are alternately repeated under the conditions in which the above-mentioned paragraphs (1) and (2) are met, a plurality of carbon dioxide clathrate lumps can be produced.

Figure 5C:
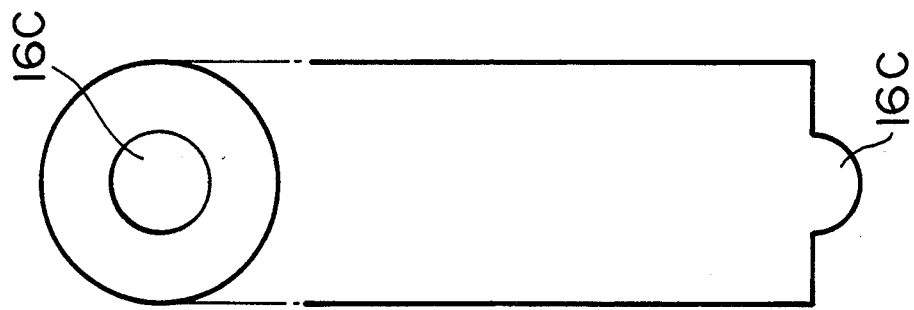
FIGS. 5($a$), 5($b$) and 5($c$) are illustrative views showing typical structures of the lug regarding one embodiment of the present invention.
Figure 5B:
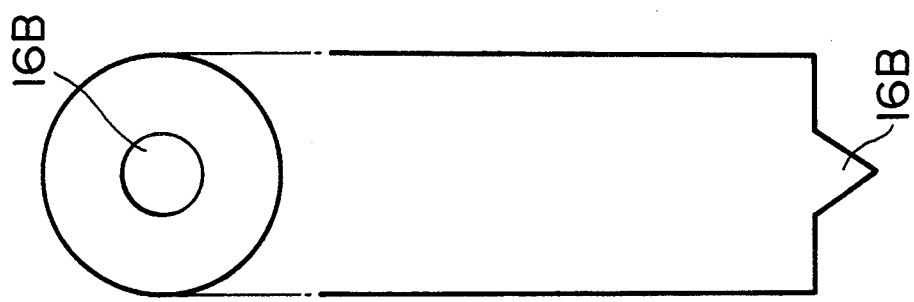
Figure 5A:
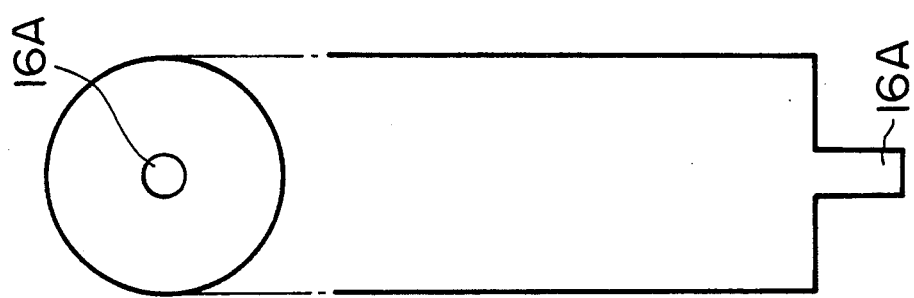

FIG. 5 (A), (B) and (C) show exemplary structures of the lug 16. FIG. 5 (A) shows a cylindrical lug 16A, FIG. 5 (B) shows a circular-cone-shaped lug 16B, and FIG. 5 (C) shows a hemispherical lug 16C.

Needless to say, in the above-mentioned embodiment, the carbon dioxide gas was used, but the carbon dioxide gas may be replaced with a liquefied carbon dioxide.

We claim:

1. A process for producing a carbon dioxide clathrate which comprises:
    the step of disposing a water portion comprising an aqueous solution of water or seawater and a carbon dioxide portion comprising carbon dioxide in a reactor so that these portions may come in contact with each other with the interposition of an interface, and positioning, in the water portion, a lug of which the temperature is controllable;
    the step of adjusting the pressure in the reactor to 13 atm or more and the temperature of the aqueous solution in the water portion to a level of more than 5° C. and not greater than 10° C., and adjusting an interface temperature between the water portion and the carbon dioxide portion to a level of more than 10° C. and not greater than 15° C.;
    the step of maintaining the temperature of the lug at a level of more than 0° C. and not greater than 5° C. to form, away from said interface, crystallized carbon dioxide clathrate on the lug; and
    the step of heating the lug to a temperature of more than 10° C. and not greater than 30° C. to separate and drop the crystallized carbon dioxide clathrate from the lug.

2. The process according to claim 1 wherein the step of forming the crystallized carbon dioxide clathrate on the lug and the step of separating and dropping the crystallized carbon dioxide clathrate from the lug are alternately repeated plural times.

3. A process of producing a carbon dioxide clathrate which comprises:
    the step of disposing a water portion comprising an aqueous solution of water or seawater and a carbon dioxide portion comprising carbon dioxide in a reactor so that these portions may come in contact with each other with the interposition of an interface:

the step of adjusting the pressure in the reactor to 13 atm or more and the temperature of the aqueous solution in the water portion to a level of more than 5° C. and not greater than 10° C., and adjusting an interface temperature between the water portion and the carbon dioxide portion to a level of more than 10° C. and not greater than 15° C.;

the step of positioning, in the water portion, a lug of which the temperature is controllable;

the step of maintaining the temperature of the lug at a level of more than 0° C. and not greater than 5° C. to form, away from said interface, crystallized carbon dioxide clathrate on the lug; and the step of heating the lug to a temperature of more than 10° C. and not greater than 30° C. to separate and drop the crystallized carbon dioxide clathrate from the lug.

4. The process according to claim 3 wherein the step of forming the crystallized carbon dioxide clathrate on the lug and the step of separating and dropping the crystallized carbon dioxide clathrate from the lug are alternately repeated plural times.

5. An apparatus for producing a carbon dioxide clathrate, said apparatus comprising:

a reactor means, including a water portion comprising an aqueous solution of water or seawater and a carbon dioxide portion comprising carbon dioxide, for contacting said portions at an interface, a temperature controlled lug disposed in said water portion of said reactor means away from said interface;

means for adjusting the pressure in the reactor means to 13 atm or more and the temperature of the aqueous solution in the water portion to a level of more than 5° C. and not greater than 10° C., and for adjusting an interface temperature between the water portion and the carbon dioxide portion to a level of more than 10° C. and not greater than 15° C.; and means for maintaining the temperature of the lug at a level of more than 0° C. and not greater than 5° C. for a period of time to form thereby forming crystallized carbon dioxide clathrate on the lug and for heating the lug to a temperature of more than 10° C. and not greater than 30° C. to separate and drop the crystallized carbon dioxide clathrate from the lug.

6. The apparatus according to claim 5 wherein means for maintaining the temperature of said lug thereby forming the crystallized carbon dioxide clathrate on the lug and heating the lug thereby dropping the crystallized carbon dioxide clathrate from the lug, comprises a means for alternately heating and cooling said lug a repeated plurality of times.

* * * * *